Oct. 5, 1926.

O. H. JOHNSON

PNEUMATIC FLOTATION APPARATUS

Filed Dec. 17, 1921    2 Sheets-Sheet 1

1,601,860

Inventor

O. H. Johnson.

By Lynn L. Steele Attorney

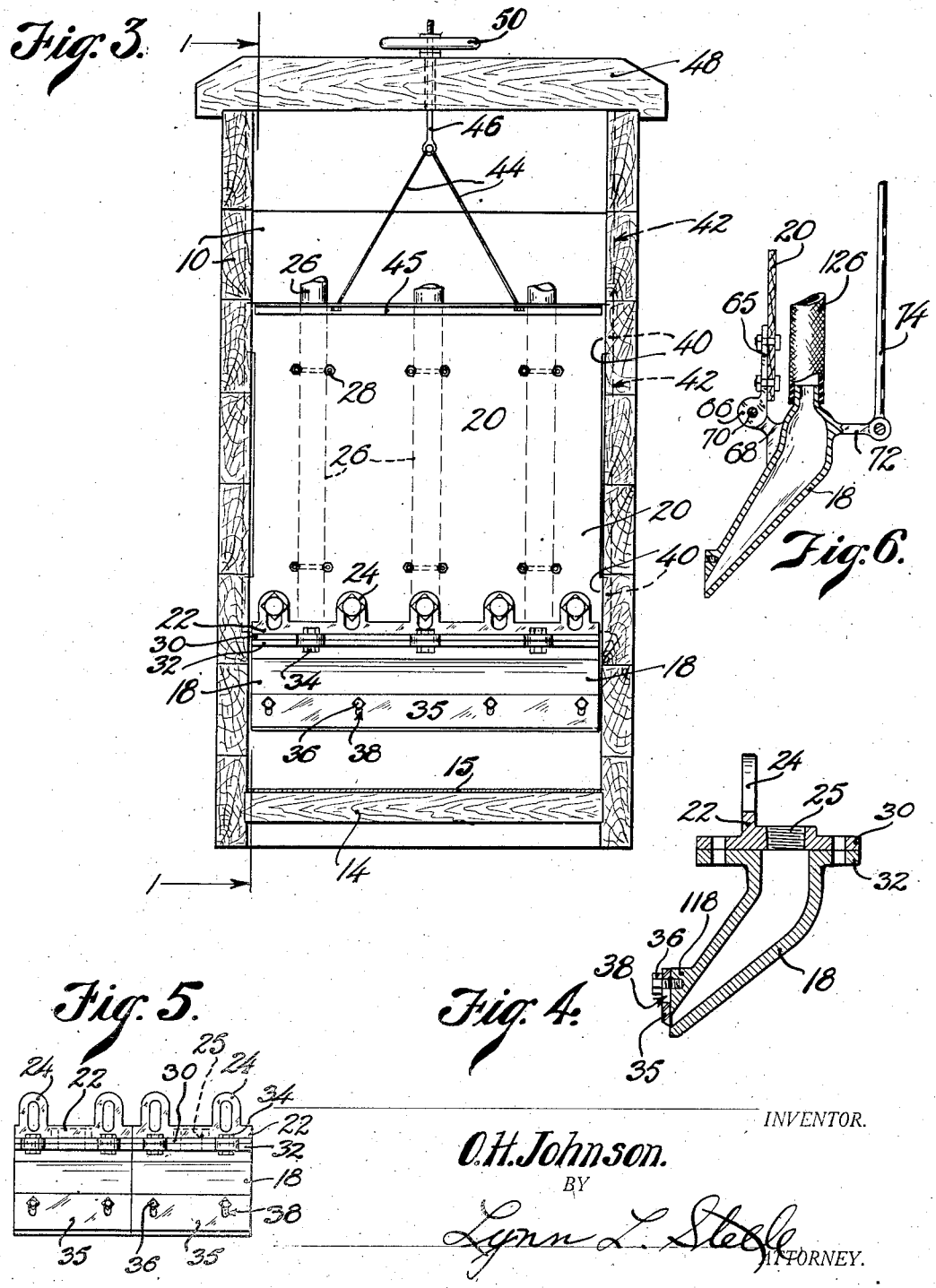

Patented Oct. 5, 1926.

1,601,860

UNITED STATES PATENT OFFICE.

OSCAR H. JOHNSON, OF DENVER, COLORADO.

PNEUMATIC FLOTATION APPARATUS.

Application filed December 17, 1921. Serial No. 523,166.

The object of this invention is to provide a pneumatic flotation machine wherein the air may be introduced efficiently by simple means and wherein the introduction of air may be controlled as desired.

Briefly the invention consists in a flotation tank having therein a partition providing ascending and descending columns, said tank having a curved or inclined bottom. The lower end of the partition carries an aerating member disposed adjacent said bottom so as to direct a thin air stream toward said bottom at an acute angle to the horizontal. The air rises in the ascending column thus producing circulation of the pulp and the pulp is drawn through a narrow opening located between the aerating member and the bottom whereby it is thoroughly aerated as it passes the aerating member and contacts with the air stream. The aerating member is in the form of an elongated nozzle having a narrow elongated slot controlled by an adjustable strip or gate.

In the drawings:

Fig. 3 is a section taken on the line 3—3 of Fig. 1;

Fig. 4 is a vertical cross section through the aerating nozzle;

Fig. 5 is an elevation showing the aerating member in the form of separate sections; and Fig. 6 is a detail of a modified nozzle mounting.

Figure 2:
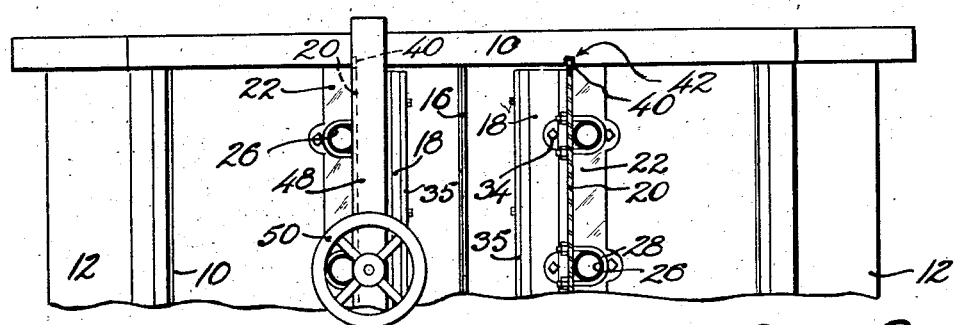
Fig. 2 is a fragmentary plan view thereof.

The flotation tank may be composed of side and end walls 10 and equipped with a froth overflow 12, a bottom wall 14 being provided for support of curved bottoms 15 whose adjacent inner edges form a joint 16.

The aerating device is in the form of a nozzle 18 which is disposed at such an acute angle to the vertical as will give efficient aeration and circulation. This angle may be at various points between the vertical and the horizontal according to conditions, that shown approximating 45°. The nozzles are preferably arranged in pairs as shown, being supported on the lower ends of partitioning walls 20 which divide the tank into an ascending column A and two descending columns D. Each nozzle member extends longitudinally of the cell and may be either in the form of a single unit as in Fig. 3, or, preferably, in the form of separate sections alined longitudinally as in Fig. 5.

The nozzles 18 are connected to the walls 20 by means of upper castings 22 which are directly secured to the walls 20 by means of ears 24, the castings 22 being provided with threaded openings 25 for the reception of air conducting pipes 26 which extend downward along the walls 20 and are secured thereto by means of U-bolts 28. The upper castings or heads 22 are secured to the nozzles 18 by means of ears 30 and 32 with which the parts are provided respectively, and bolts 34. Where the nozzle is in the form of a single unit as in Fig. 3 a plurality of pipes 26 may be used therewith. In the form of Fig. 5, each section will be apertured at 25 and be provided with its respective pipe 26. The inner wall of each nozzle is provided at its lower end with a boss 118 to which an adjustable gate 35 is secured by screws 36 passing through short slots 38 in the gate. By loosening the screws 36 the gate 35 may be easily adjusted to produce the desired slot or opening at the tip of the nozzle and thereby control the introduction of air therefrom.

The walls 20 are themselves bodily adjusted to vary the space between the bottoms 15 and the nozzles 18, and for elevating the nozzles to manipulate the screws 36. The movement is accomplished by providing the walls 10 with vertical grooves 42 in which tongues on the ends of the partitioning walls 20 are slidable as indicated at 40. Hangers 44 secured to angle bars 45 on the tops of partitions 20, serve to support the partitions from rods 46 which extend upward through timbers 48 on the top of machine and have hand wheels 50 threaded thereonto. By means of the wheels 50, the adjustment of the nozzles 18 with respect to the bottoms 15 may be quickly varied.

In operation, the gates 35 will be adjusted to give that introduction of air which will best aerate the pulp being handled. As the air is projected inward against the inclined portion of the adjacent bottom 15 it rises alongside the joint 16 and ascends in the column A. This causes the pulp in the column to rise also and thereby sets up circulation in the machine. The froth and pulp pass over the top of the partitions 20 as indicated by the arrows and the pulp returns to the bottom of the machine by way of the descending columns D, the froth rising to the overflows 12 and passing off when the machine gets under way. In this manner the thin ribbon of pulp which passes between the nozzles 18 and bottoms 15 during circulation is thoroughly aerated by the air stream being uniformly into the pulp from the nozzles, the rapidity of circulation being sufficient to produce fine diffusion of the air bubbles.

If desired to use a long cell, the individual nozzle sections of Fig. 5 will be employed, and by varying the adjustments of the gates 35 and the air pressure in the different sections, proper flotation in the successive zones of the cell may be easily maintained, even though the cell be unusually long.

Figure 1:
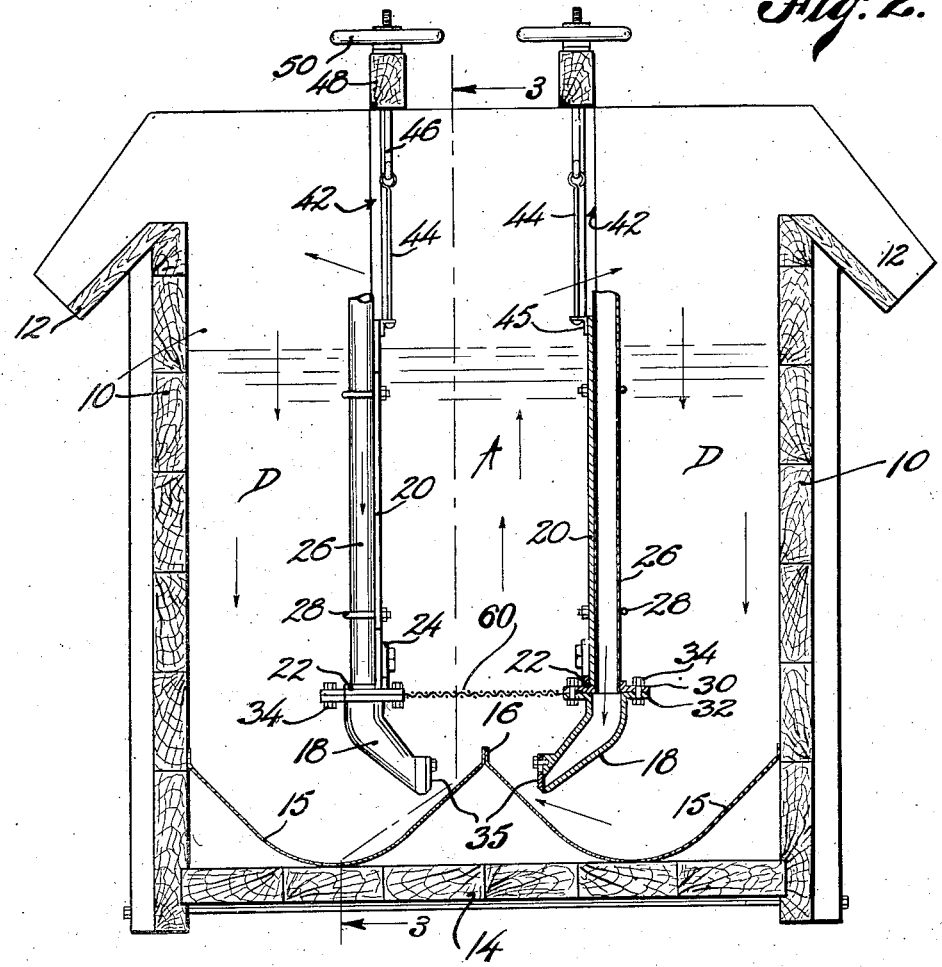
Figure 1 is a vertical cross section through a machine equipped with my invention.

For the purpose of improving the diffusion of air in the pulp, an air breaking screen 60, Fig. 1, may be horizontally disposed across the ascending column A for the purpose of breaking up large bubbles. The edges of the screen may be conveniently clamped between the adjacent castings.

In Fig. 6 there is shown a nozzle and mounting for adjustment of the nozzle 18 independently of the partition 20. Here the lower end of the partition carries a bracket 65 having ears 66 to cooperate with ears 68 on the nozzle and receive a pintle 70, whereby the nozzle is hingedly connected with the partition. Thus any position of the nozzle with respect to the bottom and the partition may be had without adjusting the partition. For instance, if the top of the partition has been set to determine a required overflow, the angle of the nozzle or its distance from the bottom may be changed by swinging the same on the hinge. This control is had by means of a rod 74 secured to an arm 72 on the nozzle.

I claim:

1. Pneumatic flotation apparatus comprising a tank adapted to contain a liquid and having a bottom, a partition therein spaced from said bottom, and an aerating member on the lower end of said partition.

2. Flotation apparatus comprising a tank adapted to contain a liquid and having a vertical partition therein whose lower end is spaced from the bottom of the tank, and an aerating member on the lower end of the partition and directed toward said bottom at an angle to the vertical.

3. Flotation apparatus comprising a tank adapted to contain a liquid and having a partition therein dividing said liquid into ascending and descending columns, said tank having an inclined bottom portion, and an aerating member on the lower end of said partition, spaced from said bottom and positioned to direct a stream of air toward said inclined bottom and at an angle to the vertical.

4. Flotation apparatus comprising a tank adapted to contain a liquid having a partition therein dividing the liquid into ascending and descending columns and having a bottom, said partition terminating at a point spaced from the bottom, and an aerating member on the lower end of said partition having an elongated narrow slot therein for directing a stream of air toward said bottom at an angle to the vertical.

5. Flotation apparatus comprising a tank adapted to contain a liquid having an inclined bottom portion and a partition dividing the liquid into columns, an aerating member mounted on the lower end of said partition and directed toward said bottom portion at an angle to the vertical, said aerating member having an elongated horizontally disposed slot spaced slightly from said bottom, and means for adjusting said partition to control said spacing.

6. In flotation apparatus a tank adapted to contain pulp, a partition wall and an elongated aerating member on the lower end thereof having an elongated slot for directing a thin stream of air into the passing pulp.

7. In flotation apparatus a tank adapted to contain pulp, a partition wall, an elongated aerating member mounted on the lower end of said wall and provided with an elongated narrow slot for the introduction of air into the pulp in the form of a thin, broad stream, and an adjustable gate on said member for varying the size of said slot.

8. In flotation apparatus a tank adapted to contain pulp, a partition wall, means for bodily adjusting said wall, an aerating member on the lower end of said wall having an elongated narrow slot for the introduction of air into the pulp in the form of a thin layer, and an adjustable member on said aerating member for controlling the size of said slot.

9. In flotation apparatus a tank adapted to contain pulp, a partition wall, and aerating means mounted on the lower end of said wall, said means comprising a plurality of sections positioned end to end, each section having an elongated narrow slot for the introduction of air in the form of a thin, broad stream into the pulp, and a separate connection for each section with a main air supply.

10. In flotation apparatus, a tank adapted to contain pulp and having an inclined bottom, a partition, an aerating member on the lower end of said partition having an elongated narrow slot spaced slightly from said bottom for directing a thin, broad stream of air toward said bottom at an angle to the vertical, means to vary the size of said slot, and means to adjust said partition to vary the distance between the slot and the bottom, whereby the ribbon of pulp passing between said aerating member and the bottom may be varied as required.

11. In flotation apparatus, a tank adapted to contain pulp and having a non-porous, inclined bottom, and an aerating member within the tank, spaced from and directed toward said bottom at an angle, the respective angles of the bottom and the aerating member being such as to insure high velocity of circulation of the pulp under and around the aerating member and upward, and the inclined bottom directing the flow past the aerating member.

In testimony whereof I affix my signature.

OSCAR H. JOHNSON.